(12) United States Patent
Sharp

(10) Patent No.: US 9,571,416 B2
(45) Date of Patent: Feb. 14, 2017

(54) SERVER AND COMPUTER INTERACTION VIA LOCAL SHARED OBJECTS

(71) Applicant: Ingersoll-Rand Company, Davidson, NC (US)

(72) Inventor: Daniel R. Sharp, Golden, CO (US)

(73) Assignee: Ingersoll Rand Company, Davidson, NC (US)

( * ) Notice: Subject to any disclaimer, the term of this patent is extended or adjusted under 35 U.S.C. 154(b) by 332 days.

(21) Appl. No.: 14/075,884

(22) Filed: Nov. 8, 2013

(65) Prior Publication Data

US 2014/0129711 A1    May 8, 2014

Related U.S. Application Data

(60) Provisional application No. 61/724,153, filed on Nov. 8, 2012.

(51) Int. Cl.
| | | |
|---|---|---|
| *H04L 12/721* | (2013.01) | |
| *H04L 12/911* | (2013.01) | |
| *G06F 17/30* | (2006.01) | |
| *G06F 21/31* | (2013.01) | |
| *G07C 9/00* | (2006.01) | |

(52) U.S. Cl.
CPC ......... *H04L 47/70* (2013.01); *G06F 17/30861* (2013.01); *G06F 21/31* (2013.01); *G07C 9/00571* (2013.01); *G07C 9/00904* (2013.01)

(58) Field of Classification Search
CPC .................. G06F 2221/2119; G06F 2221/2141
See application file for complete search history.

(56) References Cited

U.S. PATENT DOCUMENTS

| | | | |
|---|---|---|---|
| 5,768,510 A | 6/1998 | Gish | |
| 5,848,246 A | 12/1998 | Gish | |
| 5,979,254 A * | 11/1999 | Blanchet | B60S 1/166 |
| | | | 15/250.3 |
| 5,987,245 A | 11/1999 | Gish | |
| 6,038,590 A | 3/2000 | Gish | |
| 6,052,711 A | 4/2000 | Gish | |
| 6,233,620 B1 | 5/2001 | Gish | |
| 6,253,282 B1 | 6/2001 | Gish | |
| 6,266,709 B1 | 7/2001 | Gish | |
| 6,272,555 B1 | 8/2001 | Gish | |
| 6,272,556 B1 | 8/2001 | Gish | |
| 6,304,893 B1 | 10/2001 | Gish | |
| 6,424,991 B1 | 7/2002 | Gish | |
| 6,434,598 B1 | 8/2002 | Gish | |
| 7,111,037 B1 | 9/2006 | Chesley et al. | |

(Continued)

OTHER PUBLICATIONS

International Search Report and Written Opinion for PCT/US13/69307, May 7, 2014, pp. 1-8, International Searching Authority, Alexandria, VA.

(Continued)

*Primary Examiner* — Lashonda Jacobs

(74) *Attorney, Agent, or Firm* — Taft Stettinius & Hollister LLP

(57) ABSTRACT

A computer and a server may communicate via one or more local shared objects. The computer may detect one local shared object and generate a second local shared object based on the first local shared object. The computer may perform an action based on the second local shared object. The computer may display whether the action was a success.

11 Claims, 13 Drawing Sheets

(56) References Cited

U.S. PATENT DOCUMENTS

| | | | |
|---|---|---|---|
| 7,287,256 B1 * | 10/2007 | Lozben | H04L 67/1095 |
| | | | 707/999.202 |
| 7,529,682 B2 | 5/2009 | Geller et al. | |
| 7,716,489 B1 | 5/2010 | Brandt et al. | |
| 7,802,293 B2 | 9/2010 | Boyer et al. | |
| 7,809,798 B2 | 10/2010 | Chesley et al. | |
| 7,836,018 B2 | 11/2010 | Oliveira et al. | |
| 7,945,615 B1 | 5/2011 | Shetty et al. | |
| 7,945,916 B1 | 5/2011 | Lozben et al. | |
| 7,953,794 B2 | 5/2011 | Clarke et al. | |
| 8,099,766 B1 | 1/2012 | Corbett | |
| 8,112,492 B2 | 2/2012 | Chesley et al. | |
| 8,131,558 B2 | 3/2012 | Geller et al. | |
| 8,150,919 B2 | 4/2012 | Clarke et al. | |
| 8,176,163 B1 | 5/2012 | Fikes et al. | |
| 8,214,887 B2 | 7/2012 | Clark et al. | |
| 8,332,498 B2 | 12/2012 | Robinton et al. | |
| 8,341,114 B2 | 12/2012 | Mast et al. | |
| 8,381,271 B2 | 2/2013 | Dingwall et al. | |
| 2003/0140121 A1 | 7/2003 | Adams | |
| 2006/0026264 A1 * | 2/2006 | Chesley | G06F 9/54 |
| | | | 709/218 |
| 2006/0048233 A1 * | 3/2006 | Buttross | G07C 9/00023 |
| | | | 726/27 |
| 2006/0282660 A1 | 12/2006 | Varghese et al. | |
| 2008/0055306 A1 | 3/2008 | Kwok et al. | |
| 2009/0037995 A1 * | 2/2009 | Zapata | G06F 21/43 |
| | | | 726/9 |
| 2009/0070228 A1 | 3/2009 | Ronen | |
| 2009/0089420 A1 * | 4/2009 | Caruso | G06Q 30/02 |
| | | | 709/224 |
| 2009/0089869 A1 | 4/2009 | Varghese | |
| 2009/0106250 A1 * | 4/2009 | Yuriyama | G06F 21/6227 |
| 2009/0119160 A1 | 5/2009 | Woda et al. | |
| 2009/0119161 A1 | 5/2009 | Woda et al. | |
| 2010/0083358 A1 * | 4/2010 | Govindarajan | G06F 21/33 |
| | | | 726/6 |
| 2010/0100836 A1 * | 4/2010 | Corella | G06F 17/30864 |
| | | | 715/768 |
| 2011/0006879 A1 * | 1/2011 | Lambrou | G07C 9/00309 |
| | | | 340/5.64 |
| 2011/0029420 A1 | 2/2011 | Bianco et al. | |
| 2011/0078776 A1 | 3/2011 | Boyer et al. | |
| 2011/0185016 A1 | 7/2011 | Kandasamy et al. | |
| 2011/0196725 A1 | 8/2011 | Malcolmson et al. | |
| 2011/0214163 A1 * | 9/2011 | Smith | G06Q 30/02 |
| | | | 726/4 |
| 2012/0077431 A1 * | 3/2012 | Fyke | G07C 9/00015 |
| | | | 455/41.1 |
| 2012/0096131 A1 * | 4/2012 | Bhandari | G07C 9/00103 |
| | | | 709/220 |
| 2012/0209987 A1 | 8/2012 | Rhinelander et al. | |
| 2012/0215624 A1 | 8/2012 | Ramer et al. | |
| 2012/0215896 A1 | 8/2012 | Johannsen | |
| 2012/0317620 A1 | 12/2012 | Fefelov et al. | |
| 2013/0030989 A1 | 1/2013 | Geller et al. | |
| 2013/0166627 A1 * | 6/2013 | Villegas | G06F 21/6263 |
| | | | 709/203 |
| 2013/0331027 A1 * | 12/2013 | Rose | H04W 12/06 |
| | | | 455/41.1 |
| 2014/0053248 A1 * | 2/2014 | Hulusi | H04L 63/08 |
| | | | 726/4 |
| 2014/0129712 A1 * | 5/2014 | Sharp | G06F 21/31 |
| | | | 709/225 |
| 2014/0266585 A1 * | 9/2014 | Chao | G07C 9/00111 |
| | | | 340/5.61 |
| 2014/0280684 A1 * | 9/2014 | Hammond | G06F 17/30 |
| | | | 709/213 |
| 2015/0047023 A1 * | 2/2015 | Sachdeva | G06F 21/77 |
| | | | 726/19 |

OTHER PUBLICATIONS

Office Action, U.S. Appl. No. 14/075,938, dated Oct. 22, 2015.

* cited by examiner

SERVER AND COMPUTER INTERACTION VIA LOCAL SHARED OBJECTS

CROSS-REFERENCE TO RELATED APPLICATIONS

The present application claims the benefit of U.S. Provisional Patent Application No. 61/724,153, filed on Nov. 8, 2012, which is hereby incorporated by reference in its entirety.

BACKGROUND

The present application generally relates to server and computer communication, and in particular relates to server and computer communication in access control systems. Access control systems generally restrict access to certain areas, allowing certain persons access to said areas based on a credential. Some access control systems have certain limitations. Therefore, a need remains for further improvements in systems and methods for server and computer communication in access control systems.

SUMMARY

One embodiment is a unique system and method to server and computer communications. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

Figure 1:
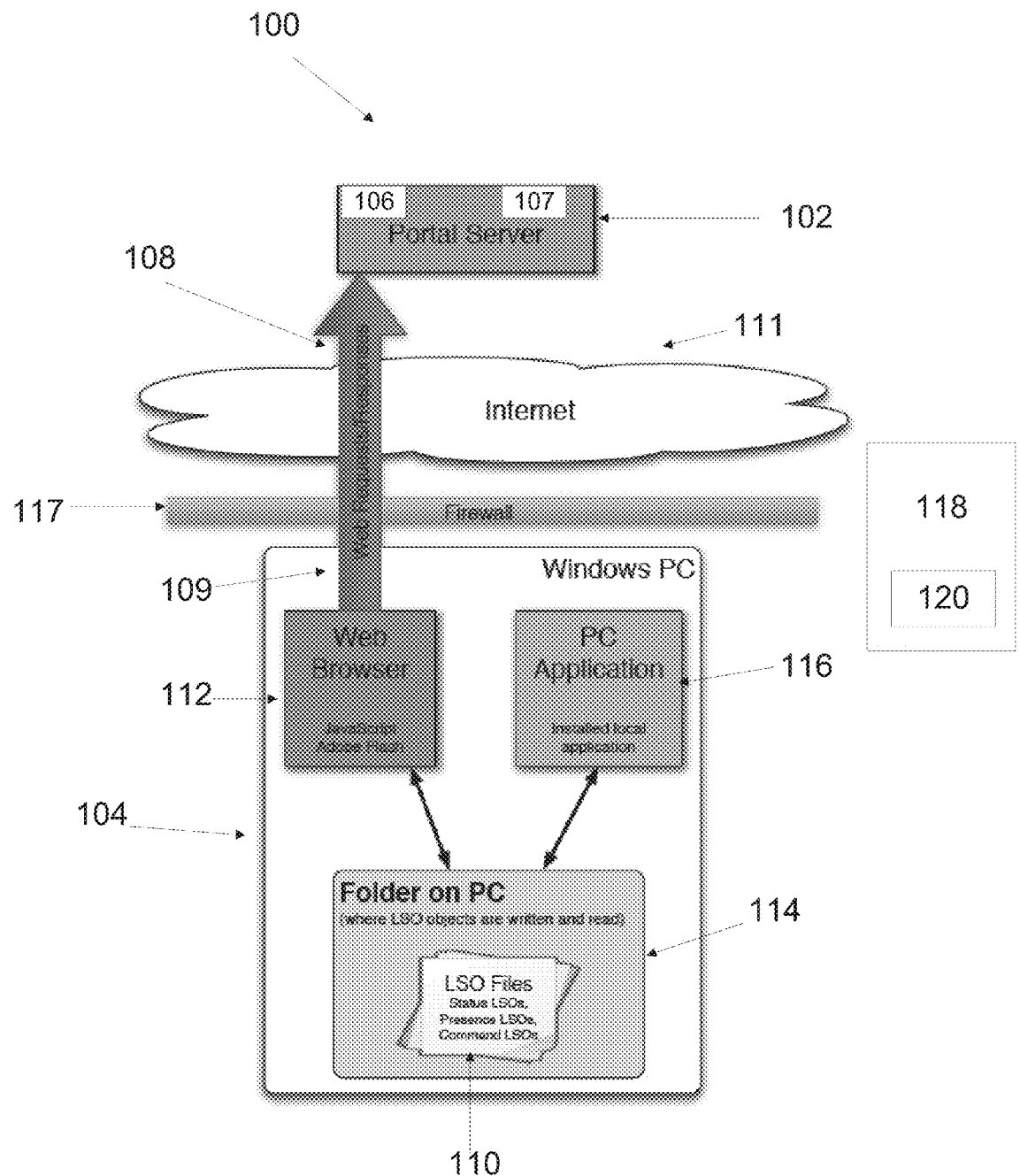
FIG. 1 is a block diagram of an exemplary server and computer interaction system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic block diagram of a system 100. The system 100 may be part of an access control system, and in particular, a multi-family access control system such as an apartment building, condominium building, hotel, etc.

The system 100 includes a server 102 and a local computer 104. The server 102 may provide one or more cloud services in the form of a cloud application 106 that is configured with non-transitory computer executable instructions to perform various operations such as transmitting responses 108 to computer-initiated requests 109. Generally, these requests 109 are not users' browser requests, but are instead requests generated by another program on the computer 104. The application 106 may also send commands or requests to the computer 104.

The cloud application 106 may be configured with non-transitory computer executable instructions to provide web portal functionality for one or more computers 104. The server 102 and the computer 104 may communicate over any appropriate network such as the Internet 111.

The server 102 may also include a database 107 to store information related to assets, such as doors and readers, in the system 100. Moreover, the database 107 may store information such as credentials, locations of doors and readers, user lists, and/or any other information for an access control system.

The local computer 104 includes one or more Local Shared Objects (LSOs) 110 that are tokens stored on the computer 104 that reflect state, commands, and/or data from the computer 104 and/or web browser 112. The web browser 112 presents to the user and allows the user to interact with an application 106, such as a Nexia Property Intelligence ("NPI") cloud application, running on the server 102.

The browser 112 may run Adobe Flash and JavaScript to read/write LSOs 110 stored on the computer 104. The LSOs 110 may be stored anywhere on the computer 102 such as in a folder 114. The computer 102 may also include an application 116 that reads and/or writes to the LSOs 110 for carrying out various operations. The application 116 may be configured with non-transitory computer executable instructions to carry out the operations utilizing the LSOs 110. The application 116 may communicate with the application 106 via the web browser 112. The computer 104 may be protected from malicious software on the Internet 111 by a firewall 117.

The system 100 includes a site 118, which includes a facility or a collection of doors and/or readers 120. The site 118 may be at the same location as the computer 102 or may be at a different location. The doors and/or readers 120 may communicate with the server 102 and/or the computer 104 over any network including the Internet 111 to receive commands for performing various operations such as programming of doors, programming credentials, acquiring status of a door or reader, etc. The doors and/or readers 120 may also communicate with the server 102 and/or the computer 104 using another device such as a handheld device to transfer data between the computer 104 and one or more doors and/or readers 120. Moreover, the computer 104 or another computer (not shown) may provide the access control system functionality to manage the doors and/or readers 120.

The server 102 and computer 104 may use a nonce (not shown), which is a unique, one-time-use code to verify a computer with the server. The nonce is a type of "handshake" similar to the hidden token in Rails forms.

In one aspect, the present application relates to a method for using the web browser 112 to control a computer application 116 including controlling hardware for an access control system. The present application allows computer activity to occur with user interface responses in the browser 112 as if the computer hardware was part of the browser by utilizing a communication between a web portal 106 on a server 102 and the computer 104 via LSOs 110. The computer application 116 uses LSOs 110 to represent state and activity on the computer 104 and the web portal 106 uses LSOs 110 to direct the computer 104 to perform a particular action or report status.

Adobe Flash and associated JavaScript in the computer's browser 112 may be used to read and write LSOs 110 to the computer 104. Thus, the reading and writing of the LSOs 110 becomes the communication mechanism between the computer application 116 (and any hardware attached) and the authenticated user in the web portal 106 (via the browser 112).

Using LSOs 110 to allow the web portal 106 and the computer application 116 to communicate with each other means that the web portal 106 user interface can interact directly with the local computer 104 without initiating network traffic or using a third layer service such as an external web server. Moreover, a hardware connection/disconnection event may be reported without the computer application 116 calling an external web server and the web portal 106 polling the external web server to inquire about the state of the connected hardware. The present application may avoid this extra timing, authentication, web traffic, and relatively greater complexity.

Generally, the web browser 112 is the only user interface in the system 100 (except the installer window that is used to install the application 116). The application 116 may use LSOs 110 to coordinate with the web browser 112. The web browser 112 may show "steps" and provide feedback of activity on the computer 104 using LSOs 110 and web browser loops for LSO detection.

By utilizing LSOs 110, the doors and/or readers 120 at the site 118 may be managed by the computer 104 and/or the server 102. The LSOs 110 are used to transfer information, including commands, between the server 102 and the computer 104 to manage the doors and/or locks 120 such as programming, acquiring status, configuring, etc.

Figure 2:
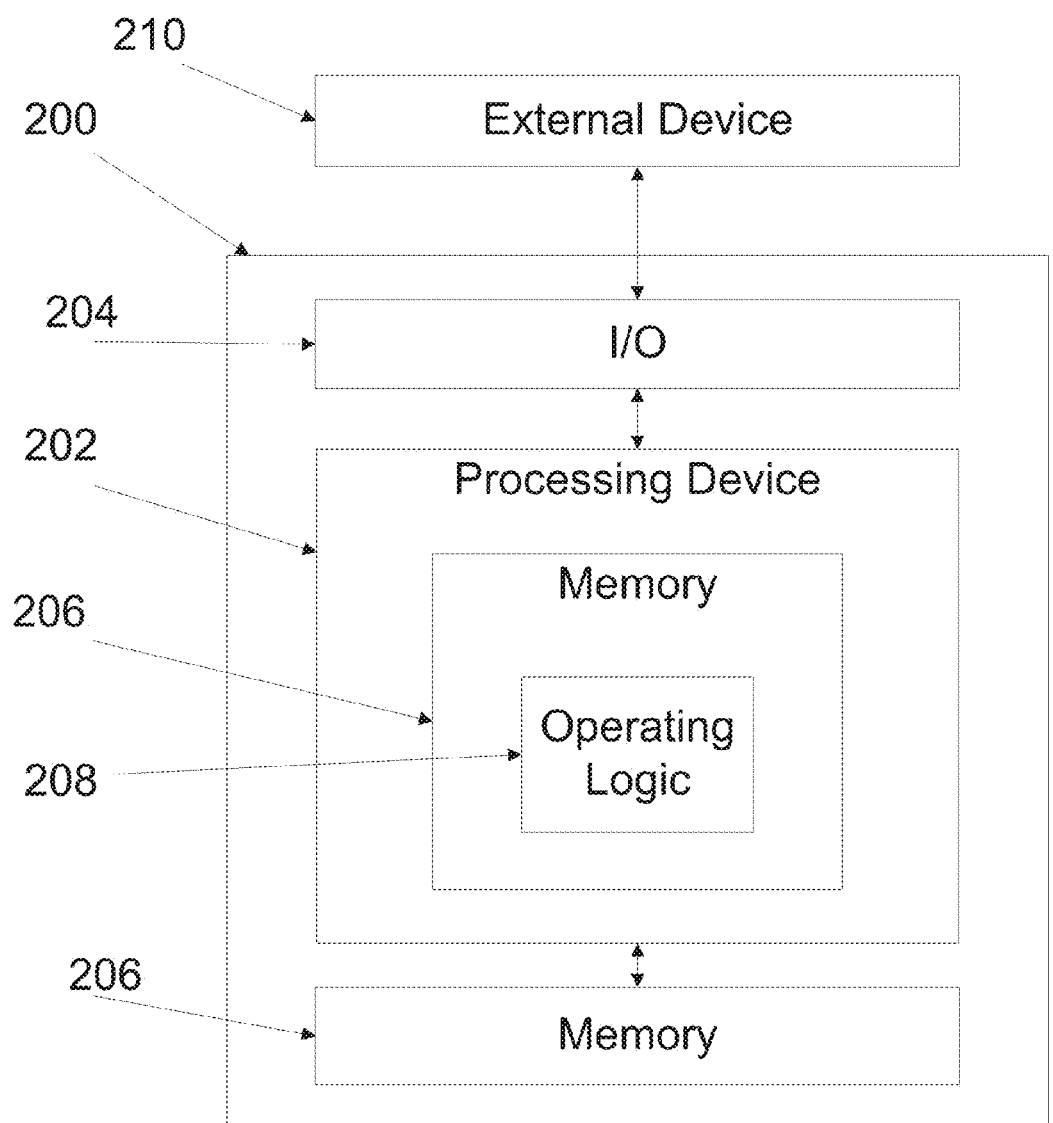
FIG. 2 is a schematic block diagram of an exemplary computing device.

FIG. 2 is a schematic diagram of a computer 200. The computer 200 may be the server 102 and/or computer 104 shown in FIG. 1. Computer 200 includes a processing device 202, an input/output device 204, memory 206, and operating logic 208. Furthermore, computer 200 communicates with one or more external devices 210.

The input/output device 204 allows the computer 200 to communicate with the external device 210. For example, the input/output device may be a network adapter, network card, or a port (e.g., a USB port, serial port, parallel port, VGA, DVI, HDMI, FireWire, CAT 5, or any other type of port). The input/output device 204 may be comprised of hardware, software, and/or firmware. It is contemplated that the input/output device 204 includes more than one of these adapters, cards, or ports.

The external device 210 may be any type of device that allows data to be inputted or outputted from the computer 200. For example, the external device 210 may be another computer, a server, a printer, a display, an alarm, an illuminated indicator, a keyboard, a mouse, or a touch screen display. Furthermore, it is contemplated that the external device 210 may be integrated into the computer 200. For example, the computer 200 may be a smartphone, a laptop computer, or a tablet computer in which case the display would be an external device 210, but the display is integrated with the computer 200 as one unit, which is consistent with the general design of smartphones, laptop computers, tablet computers, and the like. It is further contemplated that there may be more than one external device in communication with the computer 200. The computer 120 is one example of an external device 210.

Processing device 202 can be of a programmable type, a dedicated, hardwired state machine, or a combination of these; and can further include multiple processors, Arithmetic-Logic Units (ALUs), Central Processing Units (CPUs), or the like. For forms of processing device 202 with multiple processing units, distributed, pipelined, and/or parallel processing can be utilized as appropriate. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

The application 106, web browser 112, application 116 may be implemented as modules on their respective machines. Moreover, the processing device 202 in the server and in the computer 104 may include operating logic 208 stored in memory 206. These modules may be implemented in operating logic 208 as operations by software, hardware, artificial intelligence, fuzzy logic, or any combination thereof, or at least partially performed by a user or operator.

In certain embodiments, modules represent software elements as a computer program encoded on a computer readable medium, wherein a computer performs the described operations when executing the computer program. A module may be a single device, distributed across devices, and/or a module may be grouped in whole or in part with other modules or devices. The operations of any module may be performed wholly or partially in hardware/software or by other modules. The presented organization of the modules is exemplary only, and other organizations, configurations and arrangements are contemplated.

Figure 3:
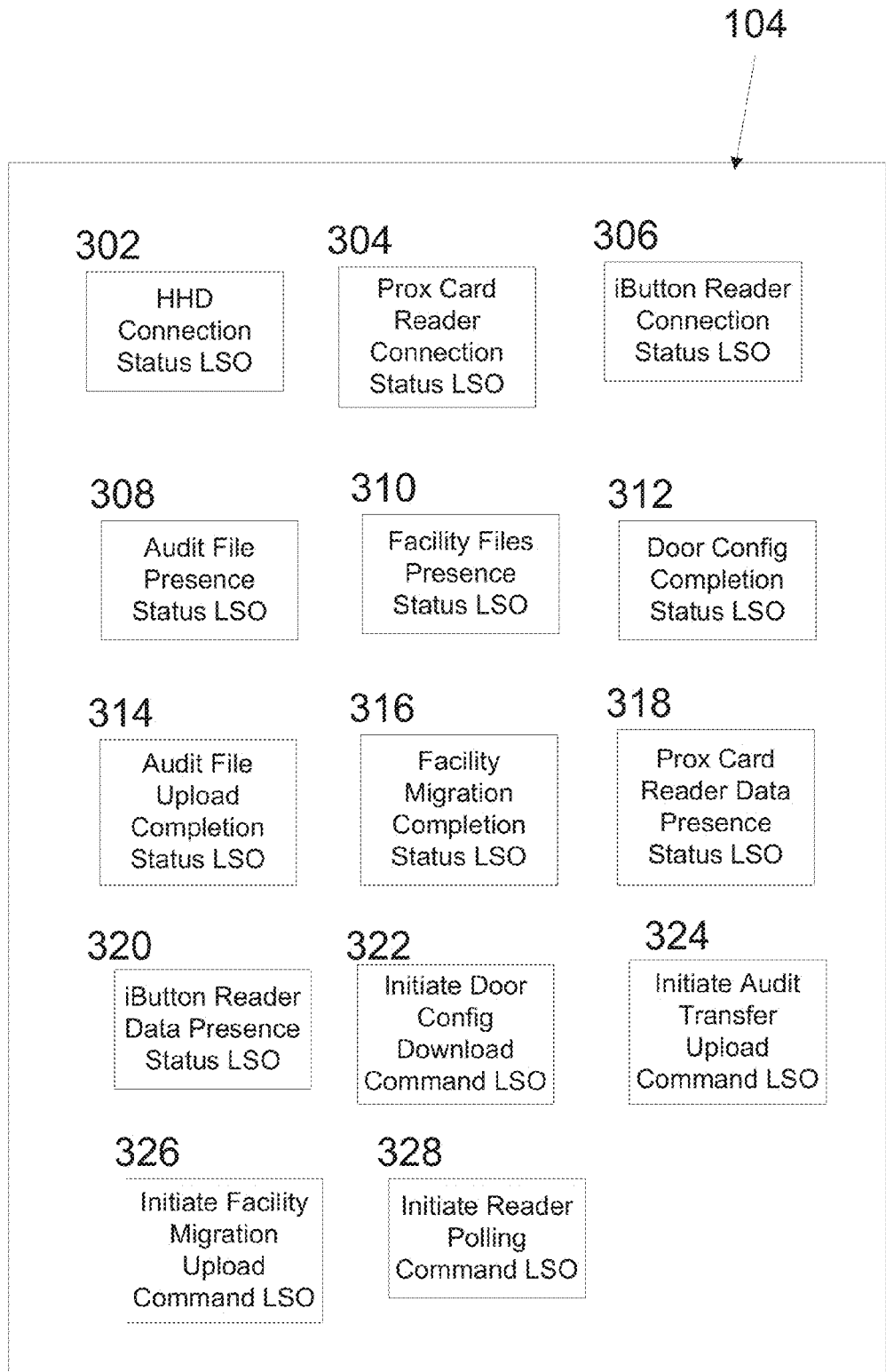
FIG. 3 is a schematic block diagram of an exemplary computing device with various Locally Shared Objects (LSOs) that may be used in an exemplary server and computer interaction system.

FIG. 3 illustrates a schematic block diagram of the computer 104 with various LSOs 110 that may be used in the system 100. Generally, there are two types of LSOs 110: Status and Command. The computer 104 creates Status LSOs in order to reflect the status of hardware, events, data, and/or errors. Status LSOs may also include additional data/information. Some Status LSOs are 'presence only' where only the existence of the LSO is relevant. Other Status LSOs include content such as success/failure, data, type, etc. The web browser 112 creates Command LSOs to instruct the computer 104 to take some action.

The following describes some of the LSOs 110 that may be used in the system 100. The following description is not exhaustive, but rather illustrative of the various LSOs that may be implemented in the system 100.

There are three Status LSOs related to Hardware Presence Detection. The Handheld Device (HHD) Connection Status LSO 302 may have the filename: hhd_detected.sol and its content includes: {result:'connected'}. The LSO 302 does not require any content as its presence is generally the determining factor. But the content can be there to simplify the creation of LSO code and keep it consistent. Upon disconnect the 'hhd_detected.sol' file should be deleted by the computer application 116. Thus, the web browser 112 can detect if the HHD is connected or not by the file's presence.

The Prox Card Reader Connection Status LSO 304 may have the filename: prox_reader_detected.sol and the content: {result:'connected'}. The LSO 304 does not require any content as its presence is generally the determining factor. But the content can be there to simplify the creation of LSO code. Upon disconnect the 'prox_reader_detected.sol' file should be deleted by the computer application 116. Thus, the web browser 112 can detect if a prox reader is connected or not by the file's presence.

The iButton Reader Connection Status LSO 306 may have the filename filename: ibutton_reader_detected.sol and the content: {result:'connected'}. The LSO 306 does not require any content as its presence is generally the determining factor. But the content can be there to simplify the creation of LSO code. Upon disconnect the 'ibutton_reader_detected.sol' file should be deleted by the computer application 116. Thus, the web browser 112 can detect if the iButton reader is connected or not by the file's presence.

There are two Status LSOs 110 related to File Presence Detection. The Audit File Presence Status LSO 308 may have the filename: audit_data_detected.sol and the content: {result:'present'}. The LSO 308 is written by the application 116 after the application 116 detects the presence of new audit data that has been sync'd to the computer 104. The presence of this status LSO 308 informs the web browser 112 that there are audit files waiting to be uploaded to the web portal 106.

The Facility Files Presence Status LSO 310 may have the filename: facility_data_detected.sol and the content: {result: 'present', data:XYZ}. The LSO 310 is written by the computer application 116 when the application 116 is started if the application 116 detects the presence of facility files, such as SMS Express LLD facility files. The presence of this status LSO 310 informs the web browser 112 that there are facility files available for migration. The contents of XYZ in the data field may be a pipe-delimited list of facility file names (not including the .lld extension).

There are three Status LSOs related to Reporting Success/Failure. The Door Config Completion Status LSO 312 may have the filename: download_status.sol and the content: {result:'success'} or content: {result:'failure', type:XYZ}. The LSO 312 is written by the application 116 when the door XML data has been converted to various formats such as .NDX and .DXX door files and synchronized with the HHD. The result field may be set to 'success' or 'failure' depending upon the outcome of the process. If something went wrong, the type field is set to a value representing where the failure occurred: 'download'=>HTTPS download failed, 'conversion'=>XML to door files conversion failed, and/or 'sync'=>transfer to the HHD failed.

The Audit File Upload Completion Status LSO 314 may have the filename: upload_status.sol and the content: {result:'success'} or content: {result:'failure', type:XYZ}. The LSO 314 is written by the application 116 as a response to the audit file upload process. The result field may be set to 'success' or 'failure', depending upon the outcome of the process. If something went wrong, the type field is set to a value representing where the failure occurred: 'upload'=>HTTPS upload/file transfer failed and/or 'parse'=>parsing uploaded file failed.

The Facility Migration Completion Status LSO 316 may have the filename: migrate_status.sol and the content: {result:'success'} or content: {result:'failure', type:XYZ}. The LSO 316 is written by the application 116 as a response to the facility migration upload process. The result field will be set to 'success' or 'failure', depending upon the outcome of the process. If something went wrong, the type field is set to a value representing where the failure occurred: 'upload'=>HTTPS upload/file transfer failed and/or 'parse'=>parsing uploaded file failed.

The following two Status LSOs relate to Reader Data Detection. The Prox Card Reader Data Presence Status LSO 318 may have the filename: prox_data.sol and the content: {result:'success', data:XYZ}. The LSO 318 is written by the application 116 after reading valid (non-zero) prox card data from the reader. The data field will be the bytes read from the prox card by the reader. The presence of this status LSO 318 informs the web browser 112 that there is prox card data waiting to be put into the credential form fields.

The iButton Reader Data Presence Status LSO 320 may have the filename: ibutton_data.sol and the content: {result: 'success', data:XYZ}. The LSO 320 is written by the application 116 after reading valid (non-zero) iButton data from the reader. The data field is the bytes read from iButton fob by the reader. The presence of this status LSO 320 informs the web browser 112 that there is iButton data waiting to be put into the credential form fields.

There are four Command LSOs 110. The Command LSOs may have the filename: command.sol and the content {type: TYPE, data:URL, facility:NAME, device:DEVICE}. The application 116 may detect the presence of a command LSO, read the command LSO, and take appropriate action based on the type field, including reading the other fields as necessary. The following types are examples of types that are supported (as the TYPE value): download=>Initiate Door Config Download, upload=>Initiate Audit Transfer Upload, migrate=>Initiate Facility Migration Upload, and poll=>Initiate Reader Polling.

With respect to the Initiate Door Config Download Command LSO 322, the application 116 may perform an HTTPS GET of the URL in the 'data' field. Upon completion, the application 116 may delete this command LSO 322 and create a Door Config Completion Status LSO 312, reporting the success or failure of the operation.

Turning to the Initiate Audit Transfer Upload Command LSO 324, the application 116 may bundle up the door audit data into one or more ZIP files and then perform an HTTPS POST to the URL in the 'data' field. Upon completion, the PC application may delete this command LSO 324 and create an Audit File Upload Completion Status LSO 314, reporting the success or failure of the operation.

Next, with respect to the Initiate Facility Migration Upload Command LSO 326, the application 116 may locate the LLD facility file as named in the 'facility' field. The application 116 will decrypt it, convert it to a set of XML files, bundle them into one or more ZIP files, and perform an HTTPS POST to the URL in the 'data' field. Upon completion, the application may delete this command LSO 326, and create a Facility Migration Completion Status LSO 316, reporting the success or failure of the operation.

Turning to the Initiate Reader Polling Command LSO 328, the application 116 may begin to poll the prox card reader or iButton reader (as determined by the 'device' field). The polling interval may be 1 second until the application 116 receives a valid response or until the max timeout (30 seconds). Upon completion, the application 116 will delete this command LSO 328. If valid data was read, the application 116 may create a Prox Card Reader Data Presence Status LSO 318 or an iButton Reader Data Presence Status LSO 320, and write the data from the reader into the LSO 318 or 320.

It is contemplated that various access control devices and technologies may be used in the system other than prox and iButton. For example, the readers may use any type of technology or multiple technologies such as Bluetooth, Near Field Communication (NFC), ISO/IEC 14443, etc.

FIGS. 4-8 illustrate various schematic block diagrams of the LSO file format used in the system 100. The LSO file format may be based on the Action Message Format 3 (AMF3) published by Adobe Systems, Inc. There are at least two types of LSO objects used by the system 100: LSOs 110 that contain only a string and LSOs 110 that contain an object of key/value pairs. For purposes of the present application, the LSO file format contains a number of bytes which can be ignored. A parser may use them for validation, however all examples in the present application will ignore them for simplicity.

Figure 4:
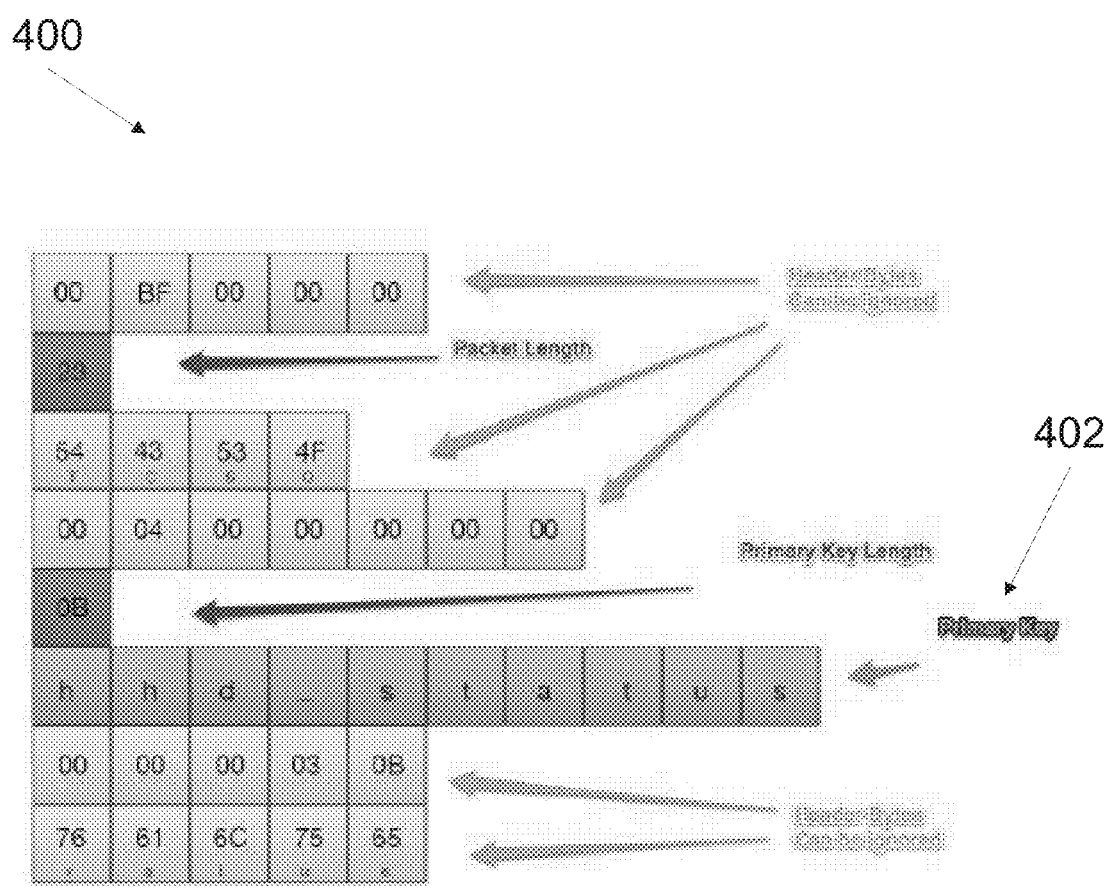
FIG. 4 is a schematic block diagram of an exemplary LSO file header.

FIG. 4 illustrates a schematic block diagram of a LSO file header 400. Generally all types of LSO files begin with the same header. The header 400 contains the primary key 402 of the object. This is the key 402 the web portal 106 and the application 116 use to communicate with each other. The key 402 will typically be the base name of the file on the computer 104. One example is the HHD Connection Status LSO 302. The computer 104 and the web portal 106 will use the key "hhd_status" 402 as seen in FIG. 4. This will be the key 402 in the header 400 and the file 302 will be named "hhd_status.sol". Each square in the header 400 is a byte. The bytes are broken down into lines for readability.

Figure 5:
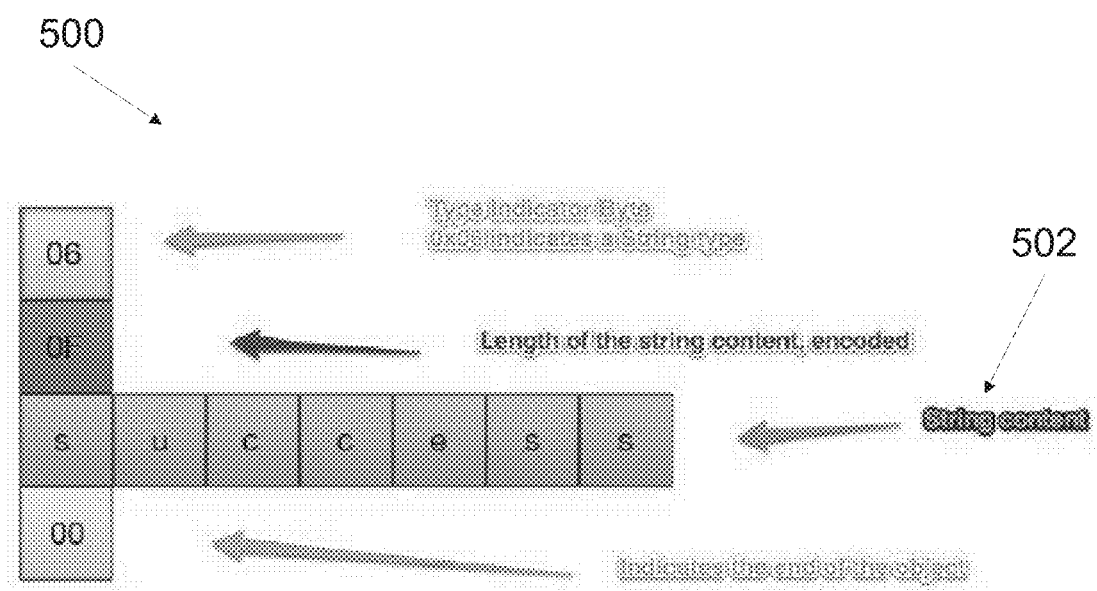
FIG. 5 is a schematic block diagram of an exemplary LSO file.

FIG. 5 illustrates a schematic block diagram of a string-only LSO file 500. Immediately following the header 400 is a byte describing the type of payload in the LSO file 110. For purposes of this application, the value 0x06 indicates string-only LSO files and the value 0x0A indicates LSO files containing a key value pair object.

The length of the string, in this example 0x0F, cannot be used directly. It is an encoded integer. To determine the proper value, the lowest bit is discarded. For example, length >>1. In this case, 0x0F shifted right once is 7, which is the length of the string "success"—the string content 502. Immediately following the string 502 is a null byte, 0x00, which indicates the end of the object.

Figure 6:
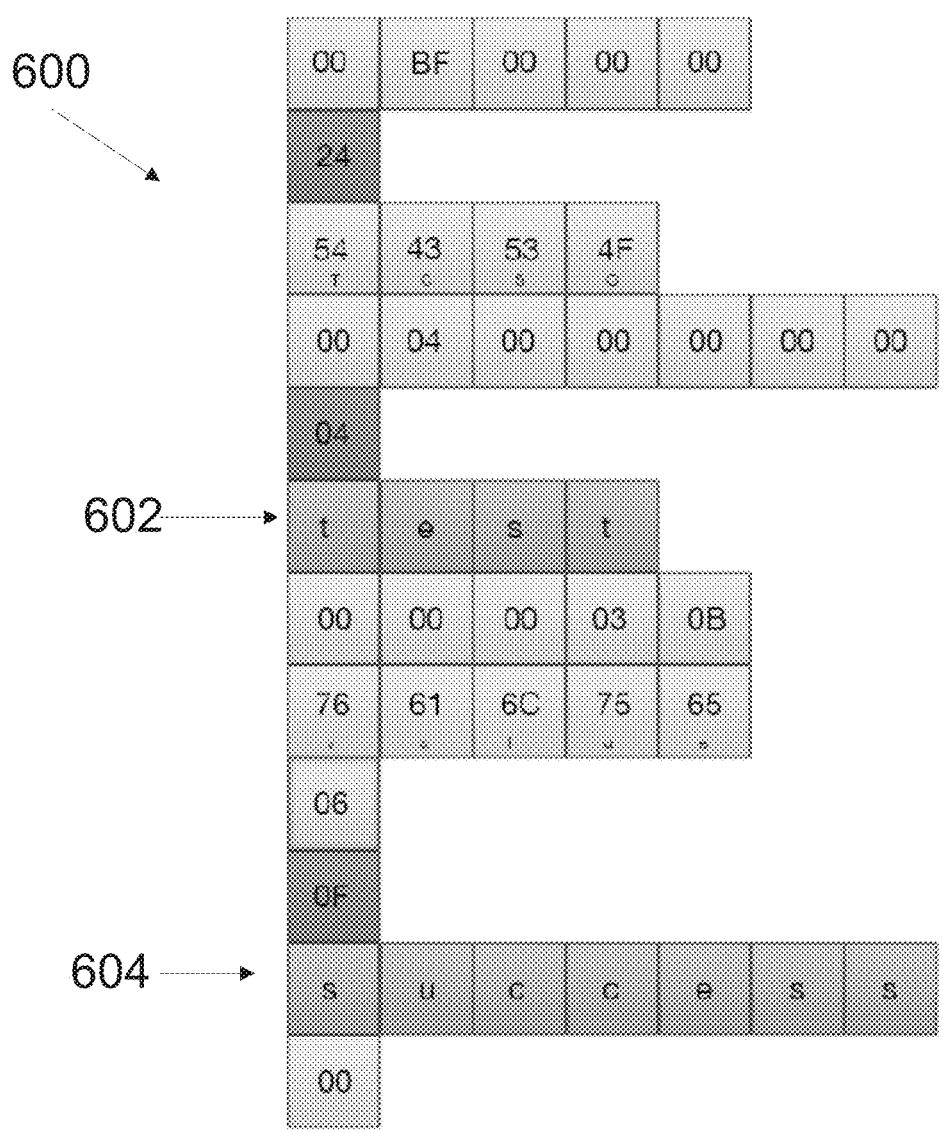
FIG. 6 is a diagram for an exemplary complete string-only LSO.

FIG. 6 illustrates a diagram for a complete string-only LSO 500 using the primary key "test" 602 and containing the string "success" 604.

Figure 7:
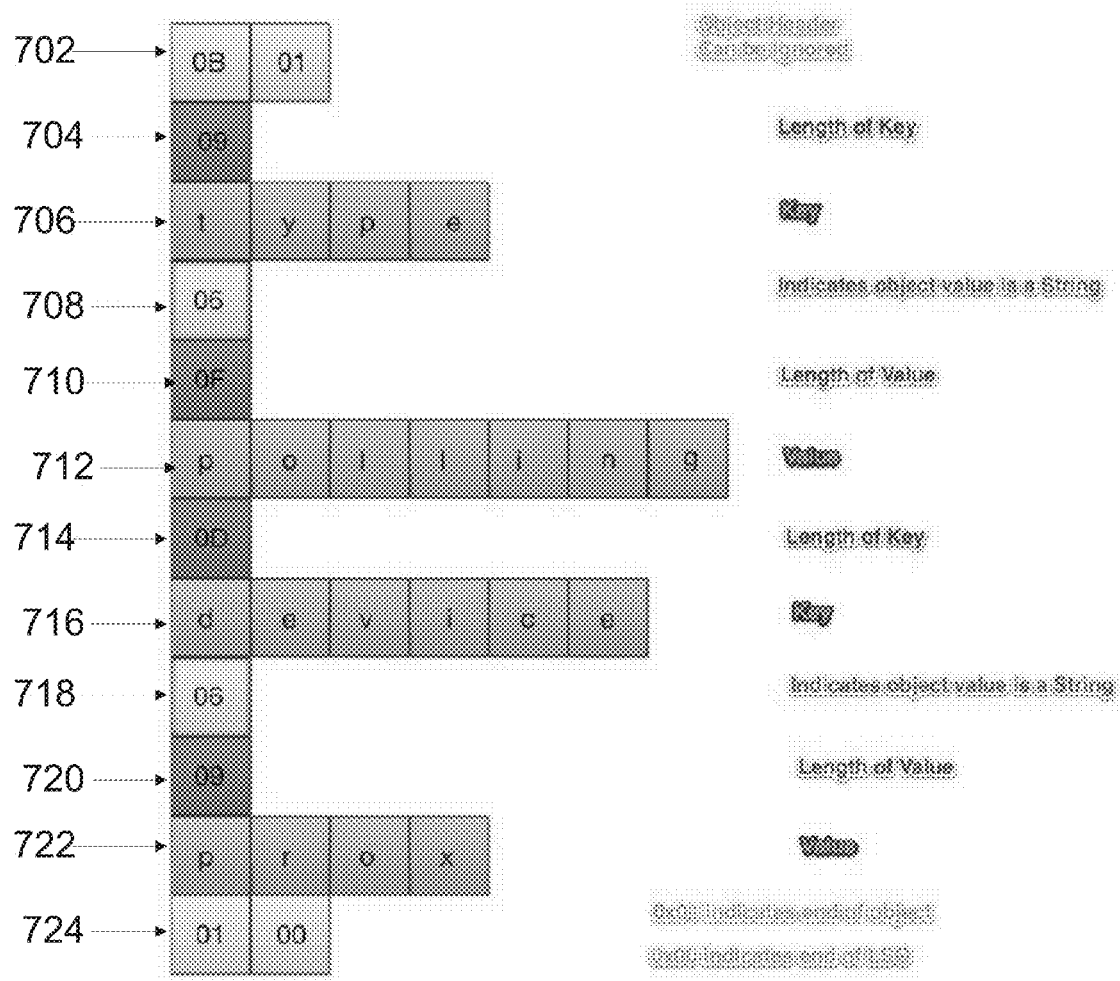
FIG. 7 is a diagram for an exemplary LSO file containing objects.

FIG. 7 illustrates a diagram for a LSO file 700 containing objects. The first row is the header 702 of the LSO 700. The second row is the length 704 of the key 706. The third row is the key 706. The fourth row includes a value 708 that indicates that the object is a string. The fifth row includes a length 710 of value. The sixth row includes a value 712 "polling". The seventh row includes a length 714 of value. The eighth row includes a key 716 "device". The ninth row has value 718 which indicates the object value is a string. The tenth row includes a value 720 "prox". The eleventh row has values 724 that indicate the end of an object and the end of the LSO 700. Each key value pair is encoded as the length of the key, the key, the value type indicator byte (which is 0x06 to indicate a string, for purposes of the present application), the length of the value, and then the value. Key value pairs may continue to be extracted until the key length byte is 0x01. In this example, all length value bytes discard the lowest bit (shifted) as described above.

Figure 8:
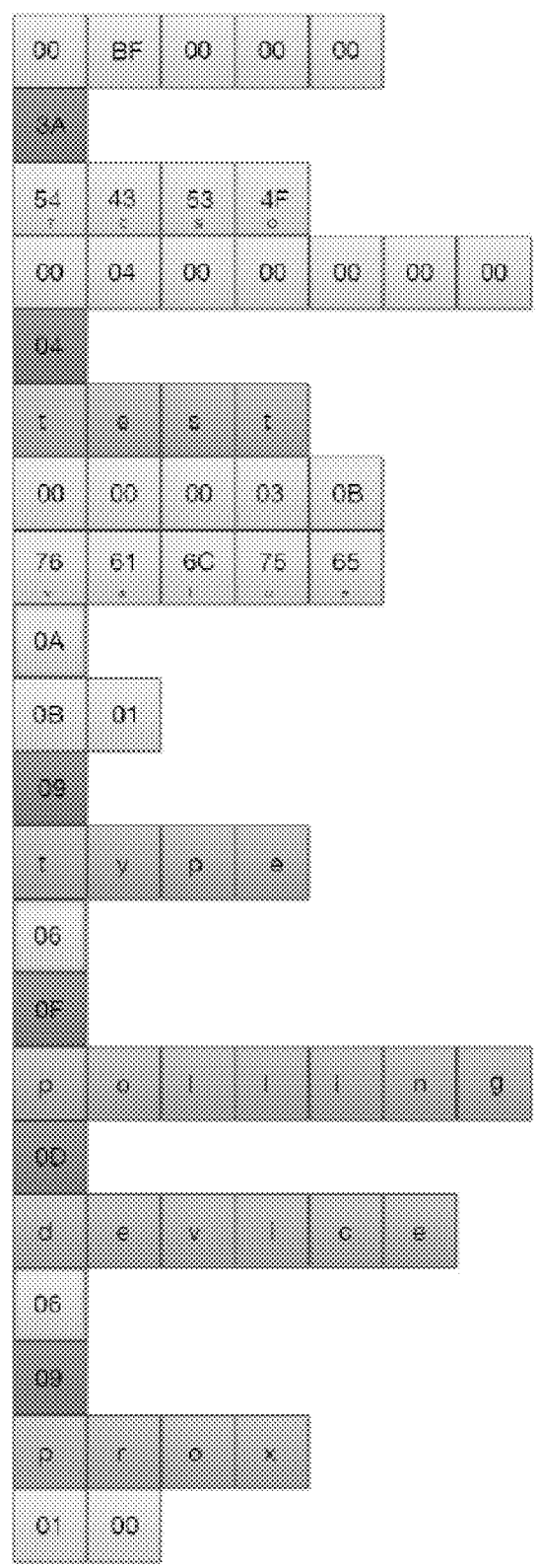
FIG. 8 is a illustrates a schematic block diagram of an exemplary complete object LSO containing key value pairs.

FIG. 8 illustrates a schematic block diagram of a complete object LSO 800 containing the key value pairs 'type'=>'polling' and 'device'=>'prox'.

The techniques in FIGS. 9-14 are exemplary of some of the ways in which LSOs 110 may be used in the system 100. Operations illustrated are understood to be examples only, and operations may be combined or divided, and added or removed, as well as re-ordered in whole or in part, unless explicitly stated to the contrary.

Figure 9:
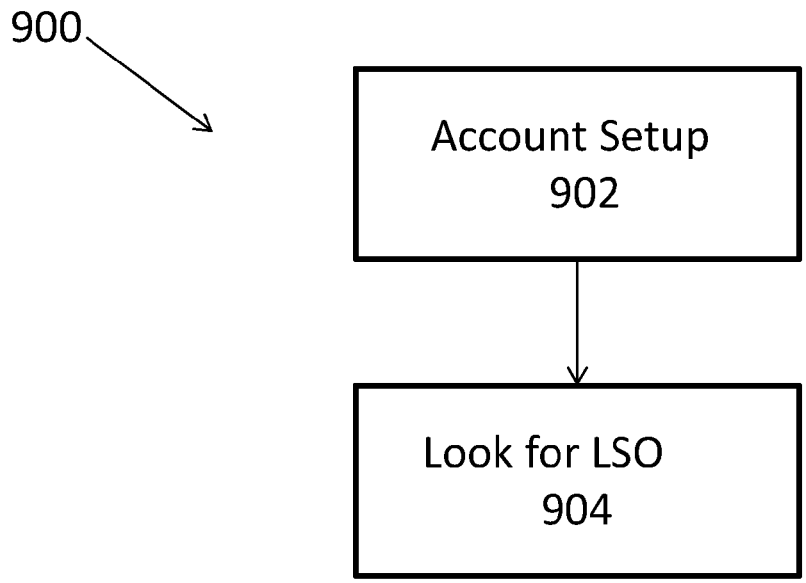
FIG. 9 is a schematic flow diagram of an exemplary technique for creating a web portal account.

FIG. 9 is a schematic flow diagram of a technique 900 for creating a web portal account. In operation 902, a user sets up his or her portal account. The user is prompted to download the computer application installer and instructed to install the computer application 116 on the computer 104 that will interface with a handheld device (HHD) and/or reader. In operation 904, if the computer application 116 is already running, the web browser 112 will look for the Facility Files Presence Status LSO 310. If the LSO 310 is present, the web browser 112 will show the option to begin data migration, which is discussed in technique 1100.

Figure 10:
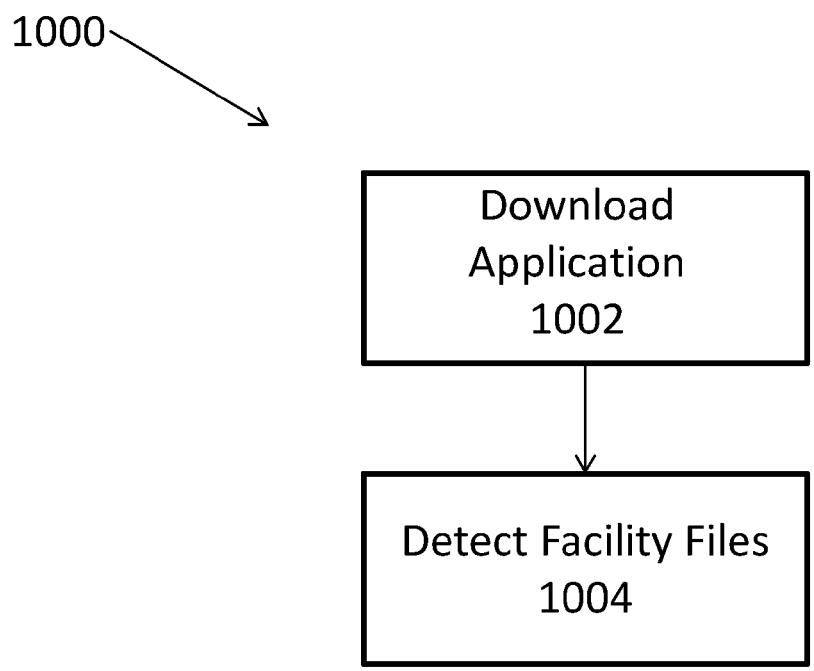
FIG. 10 is a schematic flow diagram of an exemplary technique for configuring a computing device.

FIG. 10 is a schematic flow diagram of a technique 1000 for configuring the computer 104. In operation 1002, the user downloads and installs the computer application 116. When the installation is complete, the computer application 116 is started. In operation 1004, the computer application 116 checks if there are any facility files, such as SMS Express facility files (LLD files), present on the computer 104. If there are any facility files present, the application 116 creates a Facility Files Presence Status LSO 310 with a pipe-delimited list of facility names (taken from the file names of the files that were detected).

Figure 11:
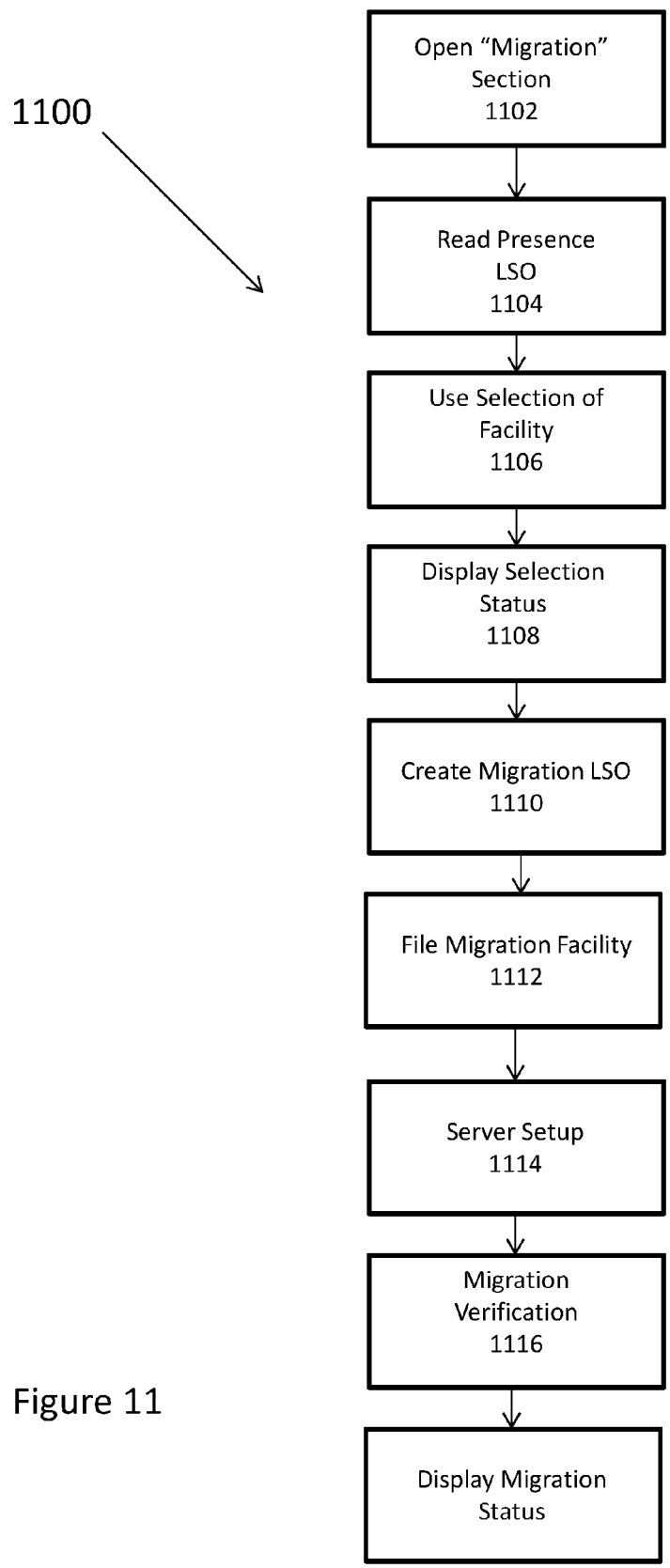
FIG. 11 is a schematic flow diagram of an exemplary technique for uploading facility data.

FIG. 11 is a schematic flow diagram of a technique 1100 for uploading facility data (i.e., data migration). In operation 1102, the logged-in user goes to the "Data Migration" section of their chosen site in the web portal 106. It is contemplated that this could be an optional step when creating or editing a site. The page may run JavaScript to detect the Facility Files Presence Status LSO 310 and do one of two things: 1. If the LSO 310 is not present, the web browser page is disabled and includes the content: "Facilities to migrate could not be found on the local computer." The remaining steps of this technique are skipped. 2. If the LSO 310 is present, the facility files are available to migrate. The web browser page is not disabled and the user can proceed to start the facility migration process.

In operation 1104, the web browser reads the Facility Files Presence Status LSO 310 to get the list of facility names and shows them in a form for user selection. In operation 1106, the user then chooses one of the facilities to migrate/import for the given site. The user then clicks the "Start Migration" button. In operation 1108, a pop-up modal window appears in the web browser 112 showing the status: "Starting facility upload for 'XYZ' . . . " (where "XYZ" would be the name of the facility chosen in the previous step). In operation 1110, the pop-up modal runs JavaScript that creates an Initiate Facility Migration Upload Command LSO 326 that includes the name of the facility file to migrate and the URL to call.

In operation 1112, the computer application 116 detects the Command LSO 326, reads it, and because it is a 'migrate' command, starts the migration/upload process: 1. The application 116 locates the facility file, such as a LLD file, based upon the 'facility' value in the LSO 326. 2. The application 116 decrypts the LLD file into an MDB file. 3. The application 116 converts the MDB file into a set of XML files. 4. The application 116 zips them into one or more ZIP files. 5. The application 116 sends the ZIP file as an HTTPS POST to the URL in the 'data' field of the LSO 326.

In operation 1114, the application 106 on the server 102 receives the HTTPS POST and does the following: 1. unpacks the ZIP file, 2. loads and parses the collection of XML files, 3. populates the cloud database 107 with the facility data for the given site 118, and 4. responds with either success (status 200) or failure (status 500).

In operation 1116, the computer application 116 receives the response to the HTTPS POST and creates a Facility Migration Completion Status LSO 316. If the response is success (status 200), the LSO 316 includes: result='success'. If the response is a failure (status 500), the LSO 316 includes: result='failure' and type='upload'. The computer application 116 deletes the Command LSO 326.

In operation 1118, when the web browser 112, using JavaScript for example, detects the Facility Migration Completion Status LSO 316, the web browser 112 reads the LSO 316 and depending upon the contents displays success or failure: On success it shows: "Facility migration complete. You can archive or delete your local LLD facility file named 'XYZ'." (where "XYZ" is the name of the LLD file that was migrated). On failure web browser 112 shows the failure message and offers the option to try again. The web browser 112 then deletes the Facility Migration Completion Status LSO 316.

Figure 12:
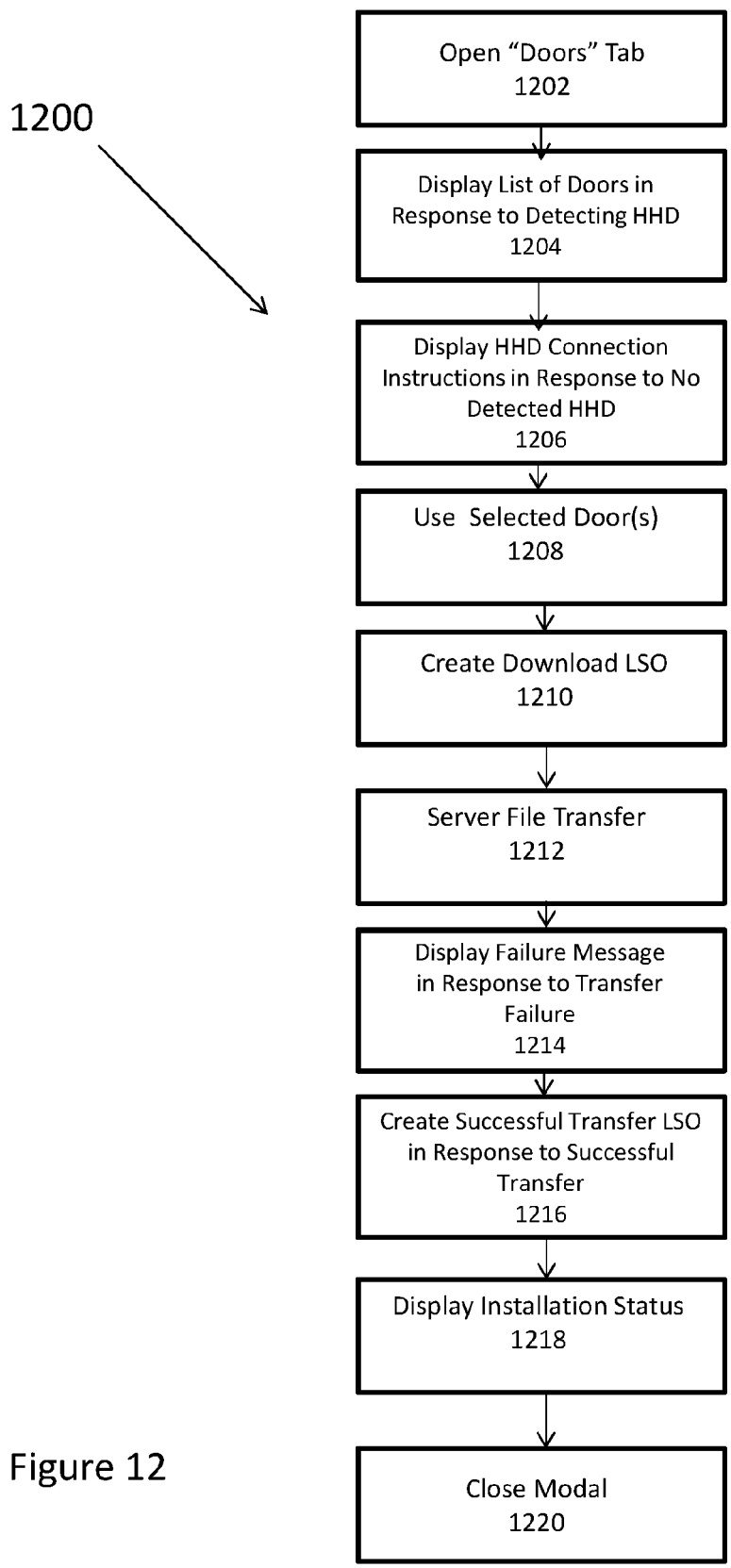
FIG. 12 is a schematic flow diagram of an exemplary technique for downloading configuration data and/or programming access control devices.

FIG. 12 illustrates a schematic flow diagram of a technique 1200 for downloading configuration data and programming doors. In operation 1202, the logged-in user goes to the "Programming Doors" sub-tab under the "Doors" tab using the web browser 112. The web browser 112 detects, using for example, JavaScript, the HHD Connection Status LSO 302. In operation 1204, if the LSO 302 is present on the computer 104, the HHD is detected. The web browser page is enabled and includes a list of doors that require programming.

In operation 1206, if the LSO 302 is not present on the computer 104, the HHD is not detected. Then, the web browser page is disabled and includes the content: "In order to program doors, you must plug in your HHD first." The web browser page includes JavaScript running in a loop that keeps trying to detect the Status LSO 302. When the user plugs in the HHD, the computer application 116 detects the connection and creates the Status LSO 302.

In operation 1208, the user then selects some or all of the doors and clicks the "Program Doors" button. A pop-up modal window appears showing the status: "Starting door configuration process . . . " In operation 1210, the pop-up modal creates an Initiate Door Config Download Command LSO 322. Then, the web browser 112 detects, for example using JavaScript, the LSO 302 and enables the page (see operation 1204).

In operation 1212, the computer application 116 detects the Command LSO 322, reads it, sees that it is of type 'download' and starts the download process: 1. The application 116 initiates an HTTPS GET to the URL in the 'data' field of the LSO 322. 2. The server 102 uses the nonce value in the URL to verify the connection and generate the XML data of all the door files. 3. The server 102 sends the XML file, including a 200 OK Success response. 4. The application 116 converts the XML file into an .NDX file and set of .Dxx door files. 5. The application 116 transfers the .NDX and .Dxx files to the HHD. 6. The application 116 creates a Door Config Completion Status LSO 312 with details of the success or failure of the process. 7. The application 116 deletes the Command LSO 322.

In operation 1214, if a failure occurs, the application 116 creates a Door Config Completion Status LSO 312 with result='failure'. The type of the failure depends upon where the failure happened: If the HTTPS GET returns a failure (401/500), the type is set to 'download'. If the conversion from XML to .NDX and .Dxx files fails, the type is set to 'conversion'. If the synchronization fails, the type is set to 'sync'.

In operation 1216, if the process completes successfully, the application 116 creates a Door Config Completion Status LSO 312 with result='success'.

In operation 1218, when the web browser 112 detects, using JavaScript, the Door Config Completion Status LSO 312, the web browser 112 reads the LSO 312 and depending upon the contents shows success or failure: On success the web browser 112 shows: "Door configuration complete. Please disconnect the HHD and program each lock." (see operation 1220). On failure the web browser 112 shows the failure message and offers the option to try again. The web browser 112 deletes the Door Config Completion Status LSO 112.

In operation 1220, the web browser 112 includes a "close" button on the pop-up modal. When the user clicks the "close" button, the web browser 112 redirects to the main doors list page and highlights all the doors that have just been programmed.

Figure 13:
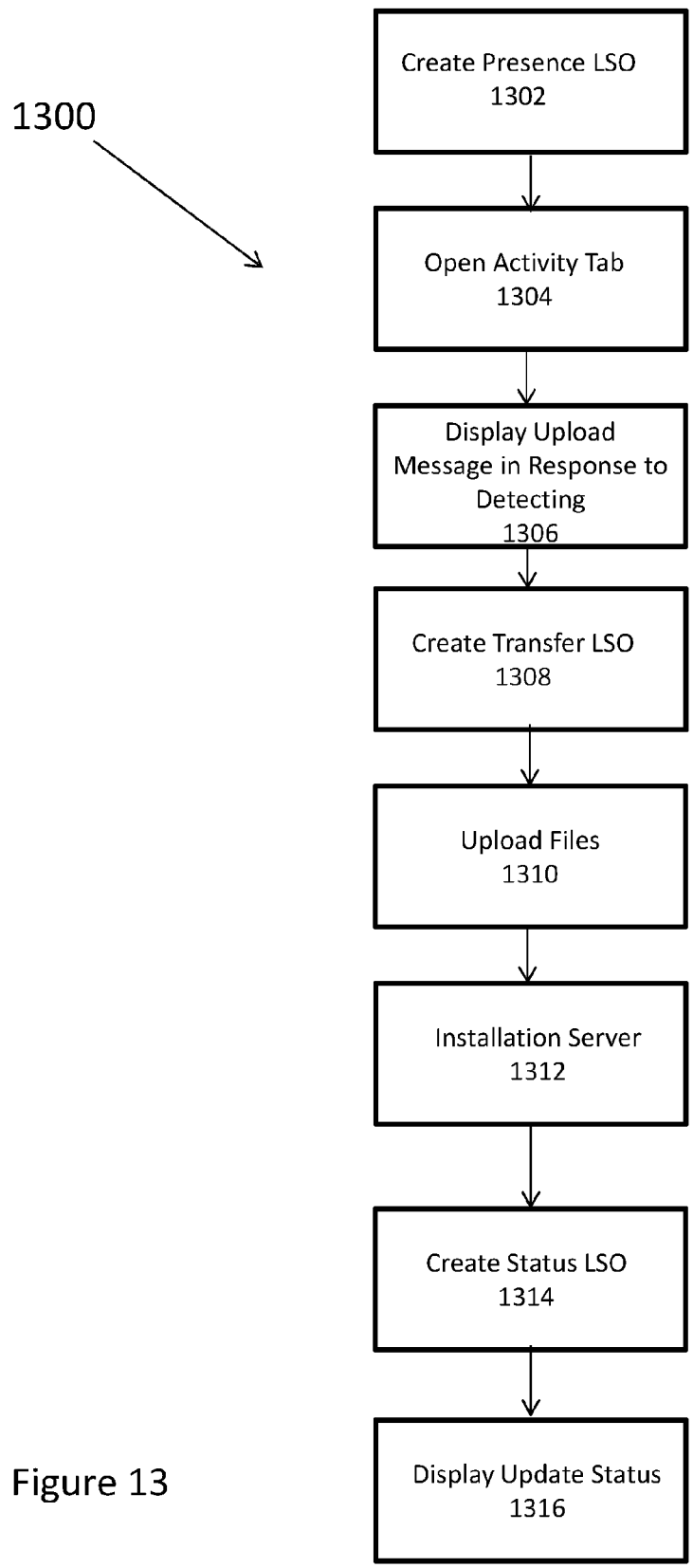
FIG. 13 is a schematic flow diagram of an exemplary technique for uploading lock audit data.

FIG. 13 illustrates a schematic flow diagram of a technique 1300 for uploading lock audit data. In operation 1302, the computer application 116 creates an Audit File Presence Status LSO 308 if the application 116 detects that there are new audit files on the computer 104. Typically, the application 116 will automatically transfer audit files from the HHD to a designated folder 114 on the computer 104 whenever an HHD is connected.

In operation 1304, the logged-in user goes to the "Activity" tab. This page in the web browser 112 may run JavaScript to detect the Audit File Presence Status LSO 308. If the LSO 308 is present on the computer 104, the web browser 112 shows a message and button: "There are new audit files to upload. Click 'upload' to begin the upload process".

In operation 1306, the user then clicks the 'upload' button in the web browser 112. A pop-up modal window appears showing the status: "Starting audit data upload . . . ." In operation 1308, the pop-up modal in the web browser creates an Initiate Audit Transfer Upload Command LSO 324 that includes the URL for the upload HTTPS POST.

In operation 1310, the application 116 detects the Command LSO 324, reads it, sees that it is of type 'upload' and starts the audit upload process: The application 116 zips the door audit files into one or more ZIP files. The application 116 sends the ZIP file as an HTTPS POST upload to the URL in the 'data' field of the LSO 324.

In operation 1312, the application 106 on the server 102 receives the HTTPS POST and performs the following: unpacks the ZIP file, loads and parses the collection of door audit files, populates the cloud database 107 with the audit data for the given site, and responds with either success (status 200) or failure (status 500).

In operation 1314, the application 116 receives the response to the HTTPS POST and creates an Audit File Upload Completion Status LSO 314. If the response is a success (status 200), the LSO 314 includes: result='success'. If the response is a failure (status 500), the LSO 314 includes: result='failure' and type='upload'. The application 116 deletes the Command LSO 324.

In operation 1316, when the web browser 112 detects, using JavaScript, the Audit File Upload Completion Status LSO 314, the web browser 112 reads the LSO 314 and depending upon the contents shows success or failure: On success the web browser 112 shows: "Door audit data upload complete." On failure the web browser 112 shows the failure message and offers the option to try again. The web browser 112 deletes the Audit File Upload Completion Status LSO 314.

Figure 14:
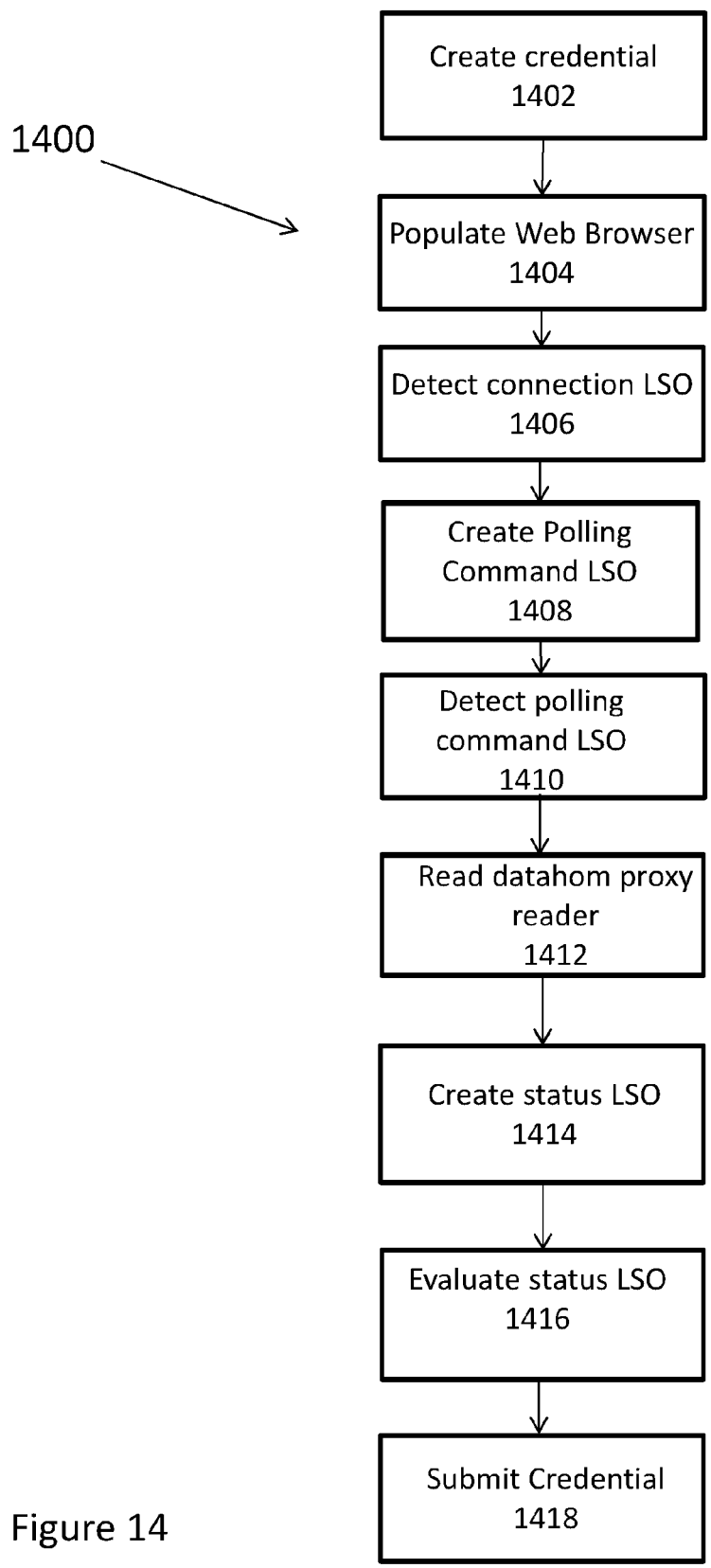
FIG. 14 is a schematic block diagram of an exemplary technique for reading data from a card via a reader.

FIG. 14 illustrates a schematic block diagram of a technique 1400 for reading prox card data from a reader. In operation 1402, the logged-in user creates a new Prox Card Credential for a person or edits an existing Prox Card Credential. In operation 1404, a page in the web browser 112 includes a button called 'Load Data From Reader' next to the "facility" and "hot stamp" form fields.

In operation 1406, the web browser page detects the Prox Card Reader Connection Status LSO 304. If the LSO 304 is present on the computer 104, the button is enabled. If the LSO 304 is not present on the computer 104, the button is disabled and the page includes instructions: "Please connect your prox card reader to your PC."

In operation 1408, when the user clicks the 'Load Data From Reader' button, the web browser 112 creates the Initiate Prox Reader Polling Command LSO 328. The web browser 112 also includes new instructions: "Tap the prox card to the reader." In operation 1410, the application 116 detects the Command LSO 328, reads it, determines that the type of command is 'polling' and that the device is 'prox'. In operation 1412, the application 116 reads data from the prox reader every second until a non-zero value is read or 30 seconds has passed.

In operation 1414, the application 116 creates a Prox Card Reader Data Presence Status LSO 318. If the prox data is non-zero, the LSO 318 includes: result='success'. If the prox reader timed out, the LSO 318 includes: result='failure' and type='timeout'. The application 116 deletes the Command LSO 328.

In operation 1416, when the web browser 112 detects the Prox Card Reader Data Presence Status LSO 318, the web browser 112 reads the LSO 318 and depending upon the contents shows success or failure: On success, the web browser 112 inserts the prox card data into the relevant form fields on the page. On failure, the web browser 112 displays the failure message and offers the option to try again. The web browser 112 deletes the Prox Card Reader Data Presence Status LSO 318.

In operation 1418, the user can then submit the "Credential" form with the data in the fields as if the data had been directly entered into the form.

It is contemplated that iButton readers may be substituted for prox card readers in technique 1400 along with using LSOs 306 and 320 instead of LSOs 304 and 318, respectively.

The server 102, and in particular the application 106, may provide commands or instructions to the web browser 112 to create, read, detect, modify, and/or delete a LSO 110 as described above with respect to techniques 900, 1000, 1100, 1200, 1300, and 1400.

In one aspect of the present application, a system, includes: a computer in communication with an asset at a facility, the computer configured with non-transitory computer executable instructions to receive information about the asset, the computer further configured with non-transitory computer executable instructions to utilize a local shared object, wherein the local shared object is structured to store the information about the asset; and a server in communication with the computer, the server configured with non-transitory computer executable instructions to receive the information about the asset via the local shared object.

Features of the aspect of the present application may include: wherein the server comprises a database, the database including a non-transitory computer readable medium configured to store at least a portion of the information about the asset; wherein the asset includes at least one of a door and a reader; wherein the computer is further configured with non-transitory computer executable instructions to program the asset; wherein the server is further configured with non-transitory computer executable instructions to issue a command to the computer, wherein the command instructs the computer to perform an action with the local shared object.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word "preferable," "preferably," or "preferred" in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
creating a status local shared object with a processing application executed by a computing device, the status local shared object storing a connection status of a hardware device structured to communicate access signals to any of a plurality of door access control devices;
storing the status local shared object in memory on the computing device;
detecting, with a web browser executed by the computing device, the status local shared object stored on the computing device;
in response to detecting the status local shared object, generating a user interface with the web browser which requests input from a user indicating a selection to program one or more of the plurality of door access control devices;
in response to input from the user, generating a command local shared object with the web browser;
storing the command local shared object in memory on the computing device;
detecting, with the processing application, the command local shared object on the computing device, the command local shared object comprising a value structured as both an instruction to be interpreted by the processing application and a value allowing authentication by the server;
in response to detecting the command local shared object with the processing application, requesting with the processing application programming information for the one or more door access control devices indicated by the user input from a server using the value of the command local shared object;
in response to the requesting, receiving the programming information from the server with the processing application; and
in response to the receiving, deleting with the processing application the command local shared object.

2. The method of claim 1, wherein the status local shared object and the command local shared object are stored in a first file system location.

3. The method of claim 1, further comprising:
generating, with the processing application executed by the computing device, a second status local shared object, wherein the second status local shared object indicates whether an instruction of the command local shared object was performed successfully;
detecting, with the web browser running on the computing device, the second status local shared object; and
in response to detecting the second status local shared object, displaying with the web browser whether the set of instructions was performed successfully.

4. The method of claim 1, wherein the status local shared object indicates a connection status of a handheld device.

5. The method of claim 4, further comprising:
transmitting the access control information received from the server to the handheld device with the processing application; and
transmitting at least a portion of the access control information from the handheld device to a lock.

6. The method of claim 1, wherein the computing device and the server communicate via the Internet.

7. An access control system comprising:
a multi-family building having at least one restricted area and a plurality of controllable door structured to grant access to one restricted area;
a computing device located in the multi-family building having memory, a web browser and a processing application;
wherein the processing application is configured to create a status local shared object and store the status local shared object in the memory of the computing device;
wherein the web browser is configured to detect the status local shared object, generate a command local shared object with the web browser in response to detecting the status local shared object, and store the command local shared object in the memory of the computing device;
wherein the command local shared object comprises a command action configured to be executed by the processing application;
wherein the processing application is further configured to detect the command local shared object and execute the command action;
wherein the command action comprises requesting data from an external device in communication with the computing device; and
wherein the processing application is further configured to delete the command local shared object in response to successfully performing the command action.

8. The access control system of claim 7, wherein the external device is one of a handheld device, a card reader, and an iButton reader.

9. The access control system of claim 8, wherein the status local shared object is created in response to the processing application detecting the external device.

10. The access control system of claim 7, wherein the multi-family building is one of an apartment building, a condominium building, and a hotel.

11. The access control system of claim 7, wherein the status local shared object comprises a token reflecting the presence of a file stored in memory on the computer or the existence of a communication connection between the computing device and an external device.

* * * * *